(12) United States Patent
Roekens

(10) Patent No.: US 10,537,188 B2
(45) Date of Patent: Jan. 21, 2020

(54) MERCHANDISER WITH FLEXIBLE TEMPERATURE CONTROLLED COLUMNS

(71) Applicant: THE COCA-COLA COMPANY, Atlanta, GA (US)

(72) Inventor: Jurgen Roekens, Kampenhout (BE)

(73) Assignee: THE COCA-COLA COMPANY, Atlanta, GA (US)

( * ) Notice: Subject to any disclaimer, the term of this patent is extended or adjusted under 35 U.S.C. 154(b) by 0 days.

(21) Appl. No.: 15/739,558

(22) PCT Filed: Jun. 22, 2016

(86) PCT No.: PCT/US2016/038790
§ 371 (c)(1),
(2) Date: Dec. 22, 2017

(87) PCT Pub. No.: WO2016/209980
PCT Pub. Date: Dec. 29, 2016

(65) Prior Publication Data
US 2018/0177310 A1 Jun. 28, 2018

Related U.S. Application Data

(60) Provisional application No. 62/182,686, filed on Jun. 22, 2015.

(51) Int. Cl.
*A47F 3/04* (2006.01)
*G07F 9/10* (2006.01)
(Continued)

(52) U.S. Cl.
CPC .............. *A47F 3/0486* (2013.01); *A47F 1/10* (2013.01); *A47F 3/001* (2013.01); *A47F 3/0426* (2013.01); *B65G 1/08* (2013.01)

(58) Field of Classification Search
CPC .......... A47F 1/12; A47F 3/0791; G07F 11/08; G07F 11/10; G07F 11/42; G07F 11/52
(Continued)

(56) References Cited

U.S. PATENT DOCUMENTS 2,250,557 A * 7/1941 Tull ......................... F25D 17/06
62/380
2,260,643 A * 10/1941 Rosan ................... G07F 7/0609
221/18
(Continued)

FOREIGN PATENT DOCUMENTS

EP 0866430 A2 9/1998
EP 1818879 A1 8/2007
(Continued)

OTHER PUBLICATIONS

Jang, Gijeong; International Search Report & Written Opinion; dated Oct. 11, 2016, pp. 1-11, Korean Intellectual Property Office, Daejeon, Republic of Korea.
(Continued)

*Primary Examiner* — Rakesh Kumar

(57) ABSTRACT

The present application provides a merchandiser for dispensing a number of products. The merchandiser may include an ambient compartment with a number of ambient product columns with a number of ambient products therein, an X-Y drive device positioned beneath the ambient compartment, and a temperature controlled compartment positioned beneath the X-Y drive device, the temperature controlled compartment including a number of temperature controlled product columns with a number of temperature controlled products therein. The X-Y drive device receives an ambient product from one of the ambient product columns of the ambient compartment and delivers the ambient
(Continued)

product to one of the temperature controlled product columns of the temperature controlled compartment.

14 Claims, 12 Drawing Sheets

(51) Int. Cl.
  *G07F 11/04* (2006.01)
  *A47F 1/10* (2006.01)
  *A47F 3/00* (2006.01)
  *B65G 1/08* (2006.01)

(58) Field of Classification Search
  USPC .......................................... 221/66, 1; 194/4
  See application file for complete search history.

(56) References Cited

U.S. PATENT DOCUMENTS

| | | | | |
|---|---|---|---|---|
| 2,266,025 A * | 12/1941 | Grau | ................ | G07F 11/52 221/152 |
| 2,371,845 A * | 3/1945 | Robison | ................ | G07F 11/04 221/281 |
| 2,496,304 A * | 2/1950 | Muffly | ................ | F25D 17/02 62/201 |
| 2,711,241 A * | 6/1955 | Abrahamsen | ........... | F25D 25/00 193/38 |
| 2,956,660 A * | 10/1960 | Nordquist | ................ | G07F 11/34 194/346 |
| 3,055,548 A * | 9/1962 | Allegri | ................ | A47F 1/10 221/281 |
| 3,231,323 A * | 1/1966 | Wells | ................ | A47F 1/12 312/234 |
| 3,743,116 A * | 7/1973 | Giessler | ................ | B65G 37/00 414/279 |
| 4,248,358 A * | 2/1981 | Muench | ................ | G07F 9/105 221/150 A |
| 4,287,992 A * | 9/1981 | Takemori | ................ | G07F 11/34 211/59.2 |
| 4,411,351 A * | 10/1983 | Lowder | ................ | G07F 7/0609 194/212 |
| 4,687,119 A * | 8/1987 | Juillet | ................ | G07F 9/105 221/101 |
| 4,823,984 A * | 4/1989 | Ficken | ................ | F25D 19/00 221/126 |
| 4,920,763 A * | 5/1990 | Provest | ................ | F25D 17/02 62/378 |
| 5,009,329 A * | 4/1991 | Farrentine | ................ | G07F 11/00 221/175 |
| 5,201,191 A * | 4/1993 | Bustos | ................ | A47F 3/0408 211/187 |
| 5,237,835 A * | 8/1993 | Brochier | ................ | F25D 17/02 62/336 |
| 5,247,798 A * | 9/1993 | Collard, Jr. | ................ | F25B 21/02 221/266 |
| 5,248,102 A * | 9/1993 | Bohn | ................ | B02C 19/0087 241/100 |
| 5,303,214 A * | 4/1994 | Kulakowski | ........ | G11B 17/225 235/385 |
| 5,335,818 A * | 8/1994 | Maldanis | ................ | G07F 11/24 221/131 |
| 5,499,707 A * | 3/1996 | Steury | ................ | G07F 7/069 186/36 |
| 5,689,967 A * | 11/1997 | Fl.o slashed.ysvik | .... | A47F 1/08 62/255 |
| RE35,743 E * | 3/1998 | Pearson | ................ | A61G 12/001 221/123 |
| 5,890,622 A * | 4/1999 | Farmout | ................ | G07B 15/04 194/902 |
| 6,047,855 A * | 4/2000 | Lin | ................ | G07F 9/10 221/150 HC |
| 6,073,460 A * | 6/2000 | Credle, Jr. | ........... | A47F 3/0486 62/250 |
| 6,173,582 B1 * | 1/2001 | Hixson | ................ | A47F 1/087 62/3.64 |
| 6,390,328 B1 * | 5/2002 | Obermeier | ............. | G07F 11/24 221/203 |
| 6,502,408 B1 * | 1/2003 | Corcoran | ................ | F25D 25/00 193/35 R |
| 6,598,789 B1 * | 7/2003 | Matsumoto | ............. | G03F 1/66 235/383 |
| 6,607,100 B2 * | 8/2003 | Phelps | ................ | B01D 53/0446 222/1 |
| 6,629,812 B1 * | 10/2003 | Lee | ................ | B65G 65/00 414/331.11 |
| 6,862,896 B1 * | 3/2005 | Seidl | ................ | F25D 3/08 220/592.16 |
| 7,150,155 B2 * | 12/2006 | Faber | ................ | A47F 1/06 62/63 |
| 7,377,123 B2 * | 5/2008 | Byrne | ................ | G07F 11/24 221/256 |
| 7,497,352 B2 * | 3/2009 | Segiet | ................ | G07F 9/105 221/150 A |
| 8,028,855 B2 * | 10/2011 | White | ................ | A47F 1/087 221/191 |
| 8,161,756 B2 * | 4/2012 | Kutta | ................ | F25D 25/04 221/150 R |
| 8,360,272 B2 * | 1/2013 | Piersant | ................ | G07F 7/0609 221/102 |
| 8,556,564 B2 * | 10/2013 | Miller | ................ | B65G 1/04 414/277 |
| 2002/0005043 A1 * | 1/2002 | Rudick | ................ | F25B 9/14 62/6 |
| 2003/0164002 A1 * | 9/2003 | Coakley | ................ | F25D 25/04 62/378 |
| 2003/0218023 A1 * | 11/2003 | Zangari | ................ | A47F 1/087 221/150 R |
| 2004/0026446 A1 * | 2/2004 | Mori | ................ | G07F 9/10 221/232 |
| 2005/0056047 A1 * | 3/2005 | Carmichael | ............. | F25D 3/08 62/457.5 |
| 2009/0076650 A1 * | 3/2009 | Faes | ................ | G07F 11/165 700/232 |
| 2011/0006074 A1 * | 1/2011 | Machers | ................ | G07F 11/20 221/150 R |
| 2011/0186591 A1 * | 8/2011 | Pfister | ................ | F25B 29/003 221/97 |
| 2012/0000744 A1 * | 1/2012 | Roekens | ................ | A47F 3/0491 194/350 |
| 2012/0000927 A1 | 1/2012 | Carpentier et al. | | |
| 2012/0173016 A1 * | 7/2012 | Piersant | ................ | G07F 7/0609 700/225 |
| 2014/0197191 A1 | 7/2014 | Ohkubo | | |
| 2018/0177310 A1 * | 6/2018 | Roekens | ................ | G07F 9/10 |

FOREIGN PATENT DOCUMENTS

| | | |
|---|---|---|
| EP | 1843304 A1 | 10/2007 |
| KR | 1020150063361 A | 6/2015 |
| WO | 2010149402 A1 | 12/2010 |
| WO | WO-2010149402 A1 * | 12/2010 ........... F25D 31/007 |

OTHER PUBLICATIONS

Horat, David; Supplementary European Search Report; dated Jan. 14, 2019, pp. 1-9, European Patent Office, The Hague, Netherlands.

* cited by examiner

MERCHANDISER WITH FLEXIBLE TEMPERATURE CONTROLLED COLUMNS

CROSS REFERENCE TO RELATED APPLICATION

This application is being filed on 22 Dec. 2017 as a National Stage Patent Application and claims priority to PCT International Patent Application Number PCT/US16/038790, filed 22 Jun. 2016, which claims priority to U.S. Provisional Application No. 62/182,686, filed 22 Jun. 2015, the subject matter of which is incorporated by reference in its entirety.

TECHNICAL FIELD

The present application and the resultant patent relate generally to merchandisers, vendors, and other types of product dispensers and more particularly relate to a merchandiser with a flexible number of temperature controlled columns so as to accommodate differing amounts of heated, refrigerated, or ambient products.

BACKGROUND OF THE INVENTION

Merchandisers such as vendors and the like generally maintain a large inventory of heated or refrigerated products therein so as to meet anticipated sales volumes. There is an ever increasing demand, however, for energy efficient or "green" devices. Maintaining such a large inventory of heated or refrigerated products for an extended period of time may not be energy efficient. Moreover, the quality of particularly heated products may decline over time. There is thus a desire for a merchandiser, a vendor, and the like with improved efficiency and reduced energy costs while maintaining an adequate inventory of products ready for sale and consumption at the desired temperature.

SUMMARY OF THE INVENTION

The present application and the resultant patent thus provide a merchandiser for dispensing a number of products. The merchandiser may include an ambient compartment with a number of ambient product columns with a number of ambient products therein, an X-Y drive device positioned beneath the ambient compartment, and a temperature controlled compartment positioned beneath the X-Y drive device, the temperature controlled compartment including a number of temperature controlled product columns with a number of temperature controlled products therein. The X-Y drive device receives an ambient product from one of the ambient product columns of the ambient compartment and delivers the ambient product to one of the temperature controlled product columns of the temperature controlled compartment.

The present application and the resultant patent further provide a method of dispensing a number of products in a merchandiser. The method may include the steps of loading a number of ambient products in a number of ambient product columns in an ambient compartment, dropping one of the ambient products into an X-Y drive device, positioning the X-Y drive device over one of a number of temperature controlled product columns in a temperature controlled compartment, releasing the ambient product into the one of the temperature controlled product columns, and dispensing a temperature controlled product from the temperature controlled product columns.

These and other features and improvements of the present application and the resultant patent will become apparent to one of ordinary skill in the art upon review of the following detailed description when taken in conjunction with the several drawings and the appended claims.

DETAILED DESCRIPTION

The present application concerns the offer for sale or other use of any number of products 10. Although the products 10 are shown, by way of example only, in the form of bottles, it is understood that the products 10 may include any type or size of container including, but not limited to, bottles, cans, pouches, boxes, wrapped items, and/or any type of rigid or flexible packaging. The products 10 may include beverages, food items, non-food items, consumer products, and/or any type of product 10 that may be positioned on a shelf and/or that may be vended. Similarly, while one use herein is for a chilled product 10, it will be understood that the products 10 herein may be at ambient, refrigerated, frozen, heated, or at any desired temperature or state. As will be described in more detail below, the products 10 herein may take the form of ambient products 20 and temperature controlled products 30. The ambient products 20 and the temperature controlled products 30 may or may not be the same products 10. Other product variations may be used herein. The scope of this application and the claims herein are in no way limited by the nature of the products 10 intended to be used herein.

Figure 1:
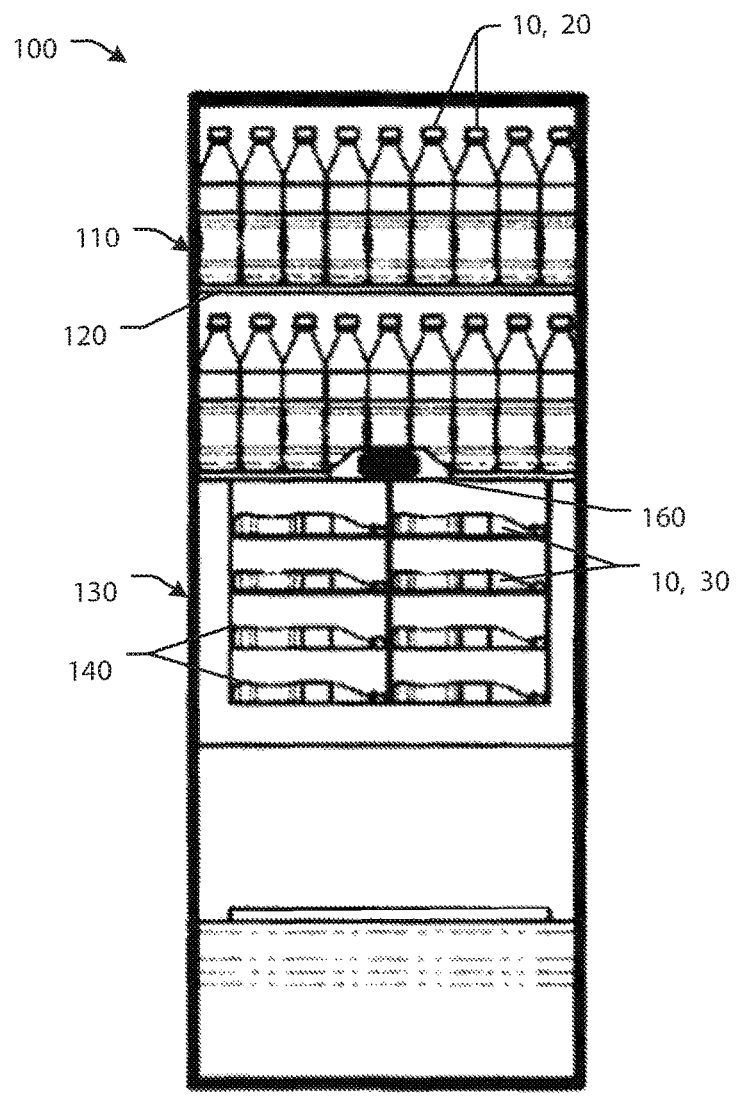
FIG. 1 is a front plan view of a merchandiser with a number of products as may be described herein.
Figure 2:
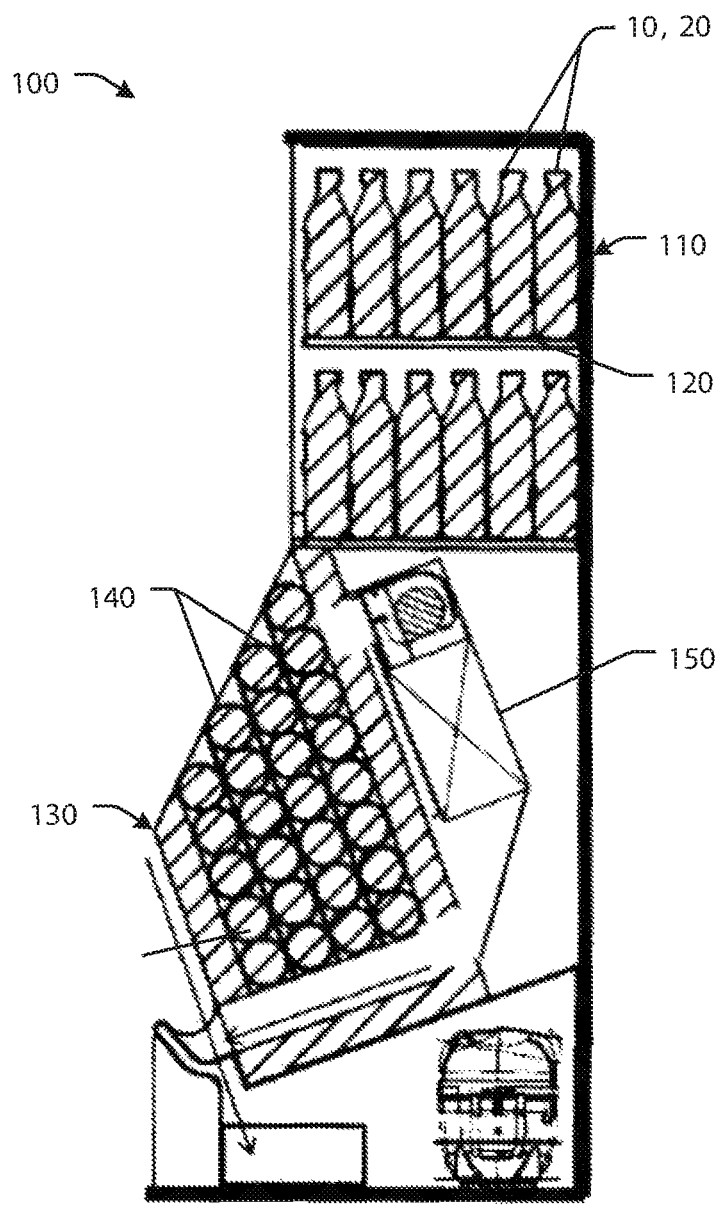
FIG. 2 is a side sectional view of the merchandiser of FIG. 1 showing the heating and refrigeration components.

Referring now to the drawings, in which like numerals refer to like elements throughout the several views, FIGS. 1 and 2 show a merchandiser 100 as may be described herein. The merchandiser 100 may include one or more ambient compartments 1 10. Each ambient compartment 1 10 may include a number of ambient compartment shelves or columns 120 therein. Any number of the ambient compartment shelves or columns 120 may be used. The ambient compartment 110 and the ambient compartment shelves or columns 120 may have any suitable size, shape, or configuration. Any number of the products 10 may be placed on the ambient compartment shelves or columns 120. The ambient compartment shelves 120 may be flat or may be any type of structure that supports the products 10 such as angled shelves, gravity fed shelves, neck tracker tubes, product chutes, and the like. Likewise, vertical columns and conventional vending columns may be used. The ambient compartment 110 and the products 10 therein may be maintained at an ambient temperature. Part of or the entire ambient compartment 110, however, may be heated, cooled, or otherwise temperature controlled on an intermittent or a temporary basis. Other components and other configurations may be used herein.

The merchandiser 100 also may include a temperature controlled compartment 130. The temperature controlled compartment 130 may be substantially enclosed and/or insulated. The temperature controlled compartment 130 may have any number of product dispensing chute mechanisms 140 positioned therein. Examples of the product dispensing chute mechanisms 140 will be described in more detail below. The temperature controlled compartment 130 also may have other types of support structures therein, such as flat shelves, angled shelves, gravity fed shelves, neck tracker tubes, product chutes, and the like. The temperature controlled compartment 130 may be at any desired temperature from freezing, chilled, ambient, warm, or hot. The temperature controlled compartment may be in communication with a conventional heating/cooling module 150 and the like. Multiple temperature controlled compartments 130 with multiple temperatures also may be used herein. Other components and other configurations may be used herein.

The temperature controlled compartment 130 and/or the ambient compartment 110 may include a scanner or other type of identification module 160. The identification module 160 may include an optical recognition device, a barcode scanner, an RFID tag reader, photoelectric cells, and/or any type of device that may read indicia on the product 10, identify the shape of the product 10, or otherwise identify or receive the identity of the product 10. For example, a camera may read the label or the cap on a bottle for identification. Alternative, the liquid level in the bottle, the color of the fluid within the bottle, or other types of indicia may be used. This process has the advantage of the label and the cap always being in the same location as well as having the ability to spot foreign items along with a valid product for improved reliability. Alternatively, the identity of the product 1 O may be entered or otherwise indicated by a consumer such as by pressing a product selection button and the like. Other types of selection means may be used herein. Although the identification module 160 is shown as being positioned adjacent to the temperature controlled compartment 130, the identification module 160 may be positioned in any convenient location. The identification module 160 also may reject or refuse to accept a product 1 O that is not intended to be used with the merchandiser 1 00 as a whole. Other components and other configurations may be used herein.

Figure 3:
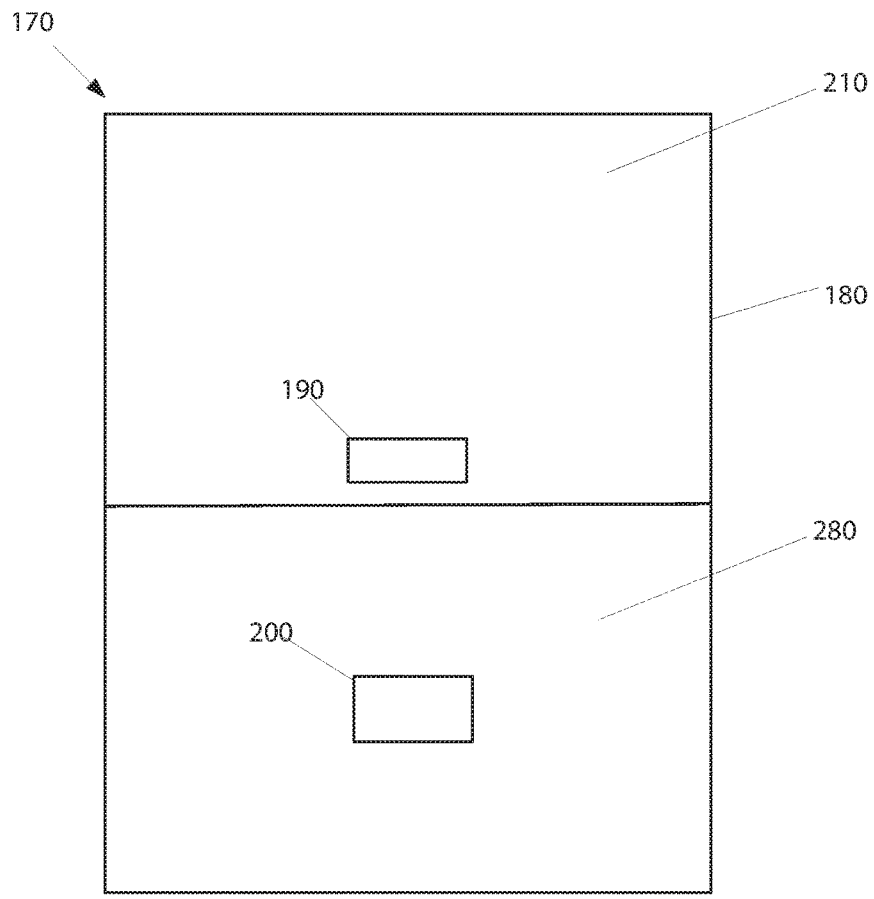
FIG. 3 is a front plan view of a further embodiment of a merchandiser as may be described herein.
Figure 4:
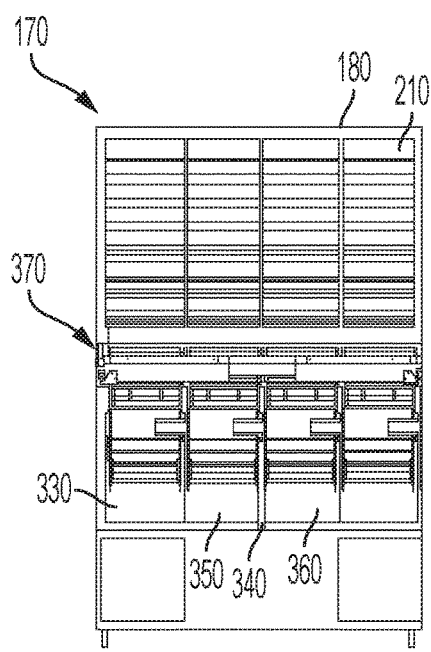
FIG. 4 is a front sectional view of the merchandiser of FIG. 3.
Figure 5:
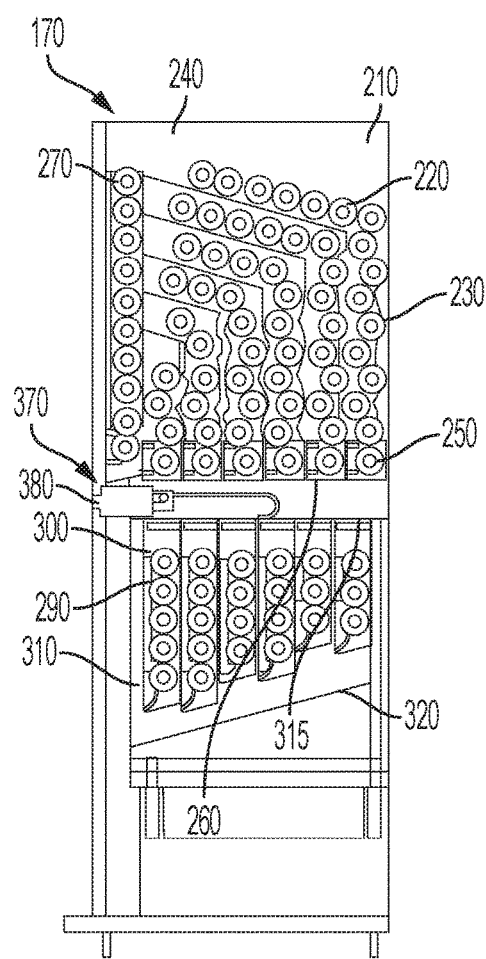
FIG. 5 is a side sectional view of the merchandiser of FIG. 3.

FIGS. 3-5 shown an example of a merchandiser 170 as may be described herein. As is shown, the merchandiser 170 may include an outer shell 180. The outer shell 180 may be made out of any type of substantially rigid material and may have any suitable size, shape, or configuration. The outer shell 180 may be insulated in whole or in part. The merchandiser 170 may include one or more dispensing ports. In this example, an ambient dispensing port 190 and a temperature controlled dispensing port 200 are shown. The dispensing ports may have any suitable size, shape, or configuration. Other types of dispensing ports also may be used herein. The merchandiser 170 may also include a payment module (not shown) for facilitating consumer payment for a product to be dispensed from the merchandiser 170. The payment module may also incorporate NFC, Wi-Fi, Bluetooth, BLE, or other such communication protocols to facilitate interaction between the merchandiser 170 and consumer electronic devices, such as a consumer cell phone, smart watch, fitness tracker or other such personal electronic devices. The dispensing ports may have any suitable size, shape, or configuration. The merchandiser 170 may also include a user interface (not shown) for providing marketing messages and otherwise interacting with consumers to facilitate payment, consumer selection of a desired product, other consumer interactions, or otherwise facilitate communication to consumers and receive input from consumers. The user interface may be embodied as a touch screen, selection buttons, key board, display, or combinations thereof. Other types of dispensing ports also may be used herein.

The merchandiser 170 may include an ambient compartment 210. The ambient compartment 210 may have any suitable size, shape, or configuration. The ambient compartment may comprise a door or other access panel for loading or merchandising additional product in the ambient compartment 210. The door or access panel may include a lock, latch, or other such access control features to prevent access to the product loaded in the ambient compartment 210 without prior payment. The ambient compartment 210 may be loaded with products 10 in any type of conventional fashion. Any number of products 10 may be used herein. The ambient compartment 210 may have a number of ambient product columns 220 therein, or possibly shelves for using with an X-Y picker type ambient dispense system.

The size or width of the ambient product columns or shelves 210 may vary according to the intended size of the products 10 to be used therein, i.e., bottles, cans, or other types of packaging. In one particular example, the ambient product columns 220 may have a serpentine configuration 230 in whole or in part. Although six serpentine product columns 230 are shown, any number may be used herein. The serpentine product columns 230 may extend from a loading end 240 to a dispensing end 250. The top serpentine product column 230 may hold the greatest number of products 10 with each sequentially lower serpentine product column 230 holding fewer products 10. The dispensing end 250 of each serpentine product column 230 may have a dispensing flap 260. The dispensing flap 260 may be opened in any suitable manner to allow a product 10 to fall therethrough when requested. Other types of dispensing mechanisms may be used. Other components and other configurations may be used herein.

In the alternative, the ambient compartment 210 may include shelves and an X-Y picker system configured to remove products from the shelves and deposit the same into product columns of the temperature controlled compartment 280, and or dispensing port 190. Such an X-Y picker system may include a shuttle or picker that moves about one side of the shelves and removes products therefrom. The shuttle or picker may also operate in unison with a trapping system positioned at the edge of each shelf arranged to allow a single product to be removed from each shelf. Other arrangements of the ambient compartment 210 are also possible.

Because the outer shell 180 around the ambient compartment 210 may not require insulation or as much insulation as a typical temperature controlled compartment, the ambient compartment 210 may have an additional dedicated ambient product column 270. The dedicated ambient product column 270 may have any suitable size, shape, or configuration. The dedicated ambient product column 270 may be positioned adjacent to the ambient dispensing port 190. Alternatively, the dedicated ambient product column 270 may be used in a manner similar to the serpentine product columns 230 to supply products 10 to be heated or refrigerated. Other components and other configurations may be used herein.

The merchandiser 170 may include a temperature controlled compartment 280. The temperature controlled compartment 280 may have any suitable size, shape, or configuration. The temperature controlled compartment 280 may be loaded with the ambient products 20 from the ambient compartment 210. Any number of products 20 may be used herein. The temperature controlled compartment 280 may have a number of temperature controlled product columns 290 therein. The size or width of the temperature controlled product columns 290 may vary according to the intended size of the products 10 to be used therein, i.e., bottles, cans, or other types of packaging. Although six temperature controlled product columns 290 are shown, any number may be used herein. As will be described in more detail below, the temperature controlled product columns 290 may include a product dispensing chute mechanism therein. The temperature controlled product columns 290 extend from a loading end 300 to a dispensing end 310. The loading end 300 of each temperature controlled product column 290 may have a loading flap 315. The loading flap 315 may be opened in any suitable manner to allow a product 10 to fall therethrough when requested. The loading flap 315 may be insulated to assist with maintaining the temperature within the temperature controlled compartment 280. The dispensing ends 310 of the temperature controlled product columns 290 may be positioned about an angled floor 320. The angled floor 320 may be angled towards the temperature controlled dispensing port 200 so as to dispense a temperature controlled product 30 under the force of gravity. The angled floor 320 may have any suitable angle. Other types of dispensing mechanisms may be used herein.

Because of the use of the angled floor 320, the temperature controlled product column 290 furthest away from the temperature controlled dispensing port 200 may be the shortest and thus hold the fewest products 10 with each temperature controlled product column 290 sequentially holding more products 10. Other components and other configurations may be used.

The temperature controlled compartment 280 may be divided into a number of temperature sections 330. In this example, four temperature sections 330 are shown although any number may be used herein. One or more movable insulating walls 340 may be positioned between one or more of the temperature sections 330. The insulating walls 340 may have any suitable size, shape, or configuration and may be made out of any material with suitable insulating capacity. The insulating walls 340 may separate one or more heated temperature sections 350 and one or more refrigerated temperature sections 360. One or more ambient sections also may be used. Depending upon the time or year, local demand, or other types of sales or availability parameters, the nature and number of the temperature sections 330 thus may be changed by moving the insulating walls 340 as desired. Other components and other configurations may be used herein.

The merchandiser 170 may include an X-Y drive device 370. The X-Y drive device 370 may be positioned between the ambient compartment 210 and the temperature controlled compartment 280. Specifically, the X-Y drive device 370 may deliver a product 10 from any one of the ambient product columns 220 to any one of the temperature controlled product columns 290. The X-Y drive device 370 may include a product carriage 380 for carrying the product 10 therein. The X-Y drive device 370 may be of conventional design and may have any suitable size, shape, or configuration. Other components and other configurations may be used herein.

In use, ambient products 10 may be loaded into the loading end 240 of the serpentine product columns 230 and the dedicated ambient product column 270 in the ambient compartment 210. If an ambient product 20 is requested, an ambient product 20 from the dedicated ambient product column 270 may be dispensed directly to the ambient dispensing port 190. Alternatively, an ambient product 20 from the dedicated ambient product column 270 may be dispensed into the product carriage 380. The X-Y drive device 370 may then dispense the ambient product 20 from the product carriage 380 into the ambient dispensing port 190. Additionally, an ambient product 20 from any of the remaining ambient product columns 230 may be dispensed to the ambient dispensing port 190 via the X-Y drive device 370 and product carriage 380. The X-Y drive device may position the product carriage 380 under the appropriate ambient product column 220. The dispensing flap 260 may be open and an ambient product 20 may drop into the product carriage 380. The X-Y drive device 370 then may position the product carriage 380 about the ambient dispensing port 190 and dispense the ambient product 20 therein. If a temperature controlled product 30 is requested, a temperature controlled product 30 may be dispensed from one of the temperature controlled product columns 290, down the angled floor 320, and out through the temperature controlled dispensing port 200.

Before or after one or more of the temperature controlled products 30 have been dispensed, the X-Y drive device 370 may position the product carriage 380 under the appropriate ambient product column 220. The dispensing flap 260 may be open and an ambient product 20 may drop into the product carriage 380. The X-Y drive device 370 then may position the product carriage 380 over the appropriate temperature controlled product column 290. The loading flap 315 may be open and the ambient product 20 may fall out of the product carriage 380 into the temperature controlled product column 290. In the case where the ambient product 20 is loaded into the product carriage 380 before a temperature controlled product 30 has been dispensed, the ambient product 20 may be loaded into the temperature controlled product column 290 at or about the same time as the temperature controlled product 30 is dispensed. The ambient product 20 then may be heated or cooled to the desired temperature of the temperature controlled products 30 therein so as to be ready for dispensing and consumption.

Through the use of the X-Y drive device 370, the fact that the longest ambient product column 220 with the most ambient products 20 is positioned over the shortest temperature controlled product column 290 with the fewest temperature controlled products 30 (and vice versa) is irrelevant. The X-Y drive device 380 can deliver an ambient product 20 to any desired temperature controlled product column 290.

Moreover, given the use of the insulated wall 340, the relative percentage of heated or refrigerated products 10 may vary as desired. The merchandiser 170 therefore may provide any number of products 10 as heated, refrigerated, or at ambient. The merchandiser 170 thus provides product flexibility in an energy efficient design. Specifically, the number of temperature controlled products 30 in the temperature controlled compartment 280 may be limited depending upon demand with more of the products 10 being stored in the ambient compartment 210 until needed. The size and volume of the ambient compartment 210 thus may be larger than the temperature controlled compartment 280.

Figure 6:
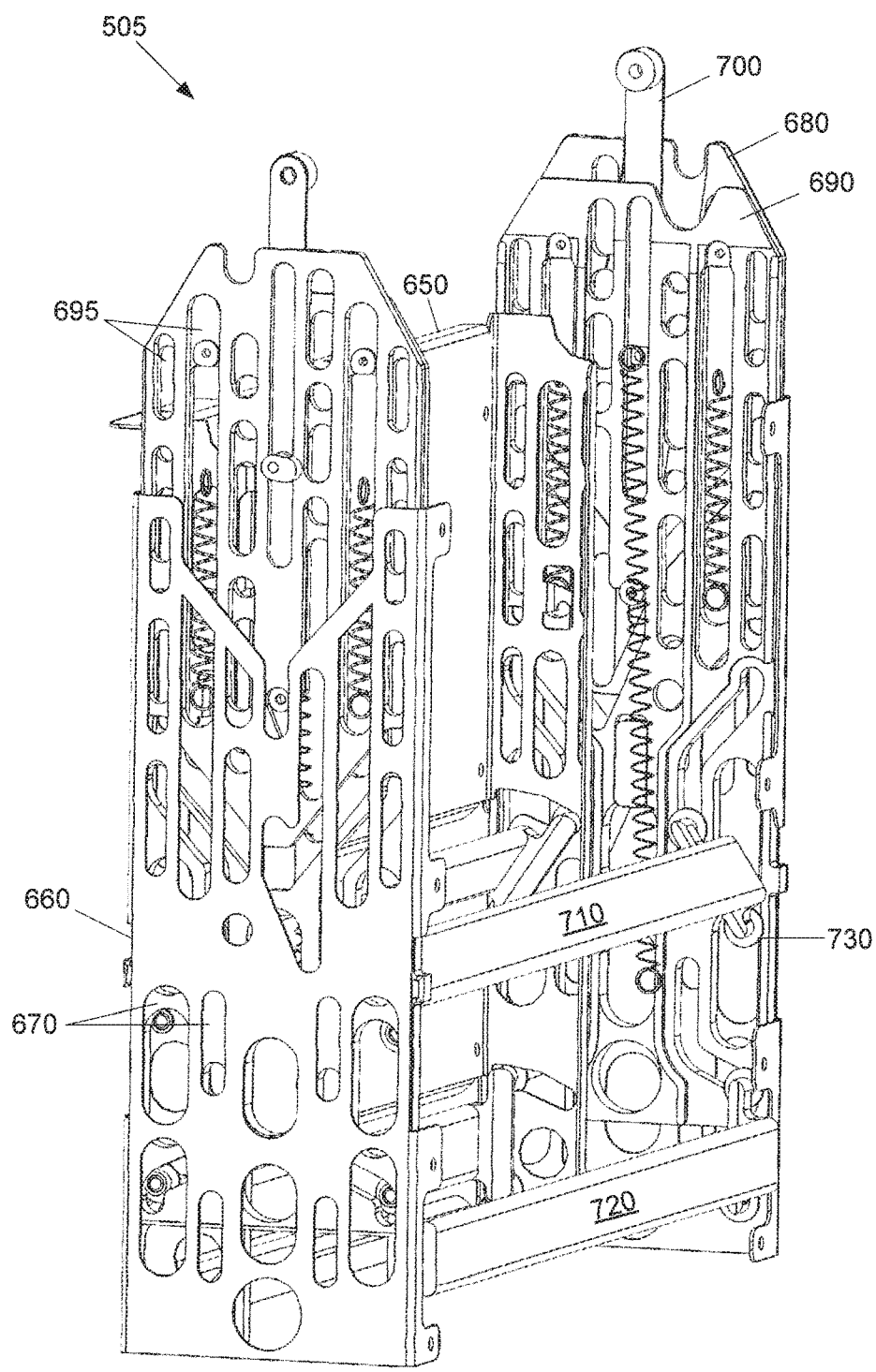
FIG. 6 is a perspective view of a product dispensing chute that may be used with the merchandiser of FIG. 3.

FIG. 6 shows an example of one possible type of a product chute 505 for use in the temperature controlled product columns 290. The product chute 505 is shown in an extended, dispensing position. The product chute 505 may have a pair of lateral walls 650, one of which is removed in FIG. 6 for clarity. Each product chute 505 also may include a pair of dispensing walls 660. The dispensing walls 660 may have any number of dispensing wall apertures 670 therein. The dispensing wall apertures 670 may be sized and positioned so as to accommodate the various rollers and rods described below. Each of the dispensing walls 660 may have an upper guide plate 680 and a lower guide plate 690 positioned for movement therein. The guide plates 680, 690 may spring loaded. An activation lever 700 may extend between the guide plates 680, 690 for movement therewith. The activation lever 700 also may be spring loaded. A pair of upper stopper plates 710 and a pair of lower stopper plates 720 may be positioned about the lower guide plate 690. The stopper plates 710, 720 may have a number of roller bearings 730 and the like positioned within the guide plate apertures 695 for movement therewith. Other components and other configurations may be used herein.

Positioning the product carriage 380 over the temperature controlled product column 290 may cause the product carriage 380 to engage the activation lever 700 of the given product chute 505. Engaging the activation lever 700 may raise the upper guide plate 680. The lower stopper plates 720 begin in an engaged position to support a product 30 therein while the upper stopper plates 710 are open. Further motion pulls the lower guide plate 690 such that upper stopper plates 710 close and then the lower stopper plates 720 open such that a temperature controlled product 30 falls out of the product chute 505. Other components and other configurations may be used herein.

Figure 7:
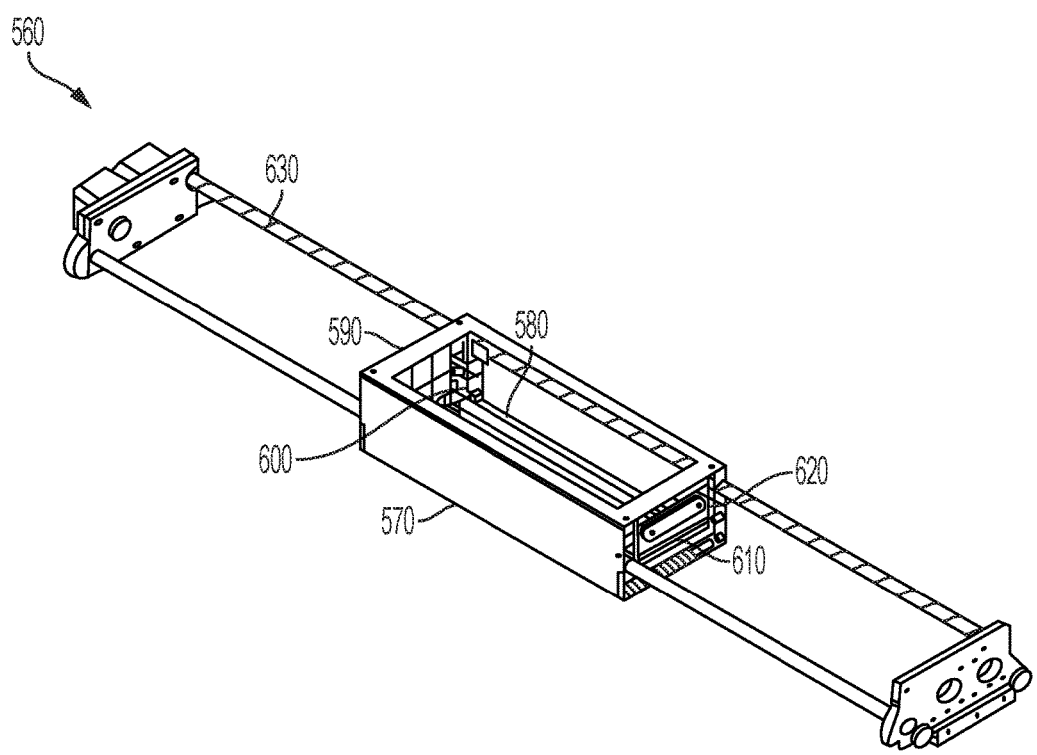
FIG. 7 is a perspective view of an X-Y drive device that may be used with the merchandiser of FIG. 3.

An embodiment of the X-Y drive device 360 is shown in FIG. 7. As is shown in FIG. 7, the X-Y drive device 560 may include a product carriage 570. The product carriage 570 may have a number of product support bars 580 therein. The product support bars 580 may extend along the length of the product carriage 570 and beyond the lateral walls 590 of the product carriage 570. The product support bars 580 may be movable within a number of support bar slots 600. The support 20 bar slots 600 may have a substantial "J" shape such that the support bars 580 may be maneuvered so as to allow a product 10 to fall therethrough. Each of the walls 590 also may have a locking plate 610 thereon. The locking plate 610 may have a number of locking plate slots 620. The locking plate slots 620 may accommodate the product support bars 580 so as to pivot the product support bars 580 open and closed.

The X-Y drive device 560 may include a number of X drive rods 630. The X drive rods 630 may extend along a first dimension of the merchandiser 170. The product carriage 570 may maneuver along the X drive rods 630 in the X direction. The X y drive device 560 also may include a number of Y drive rods 640. The Y drive rods 640 may extend along a second dimension of the merchandiser 170. The product carriage 570 and the X drive rods 630 may maneuver in the Y direction along the Y drive bars 640. The X-Y drive device 560 may be of conventional design. The X drive rods 630 and the Y drive rods 640 may be motor driven. Other components and other configurations may be used herein.

Figure 8:
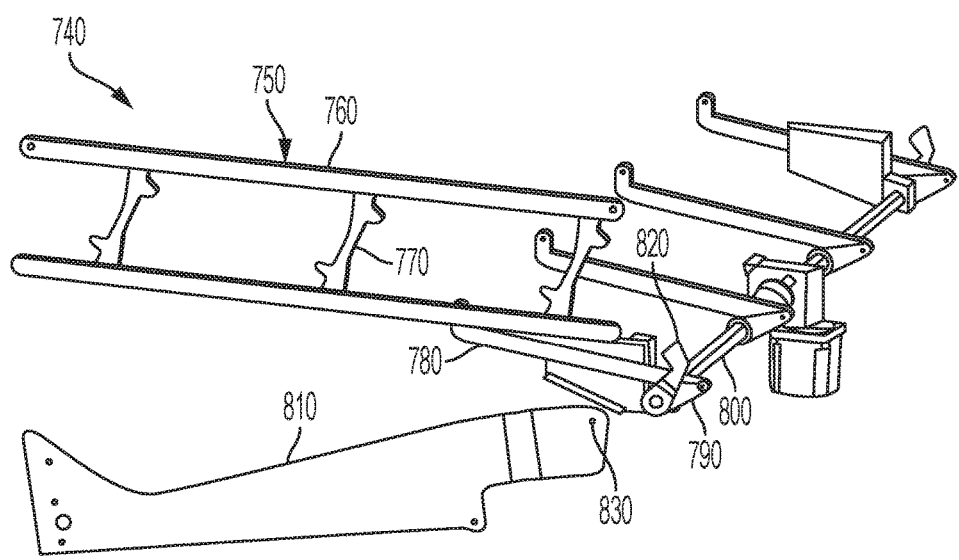
FIG. 8 is a perspective view of a product dispense activation mechanism that may be used with the merchandiser of FIG. 3.
Figure 9:
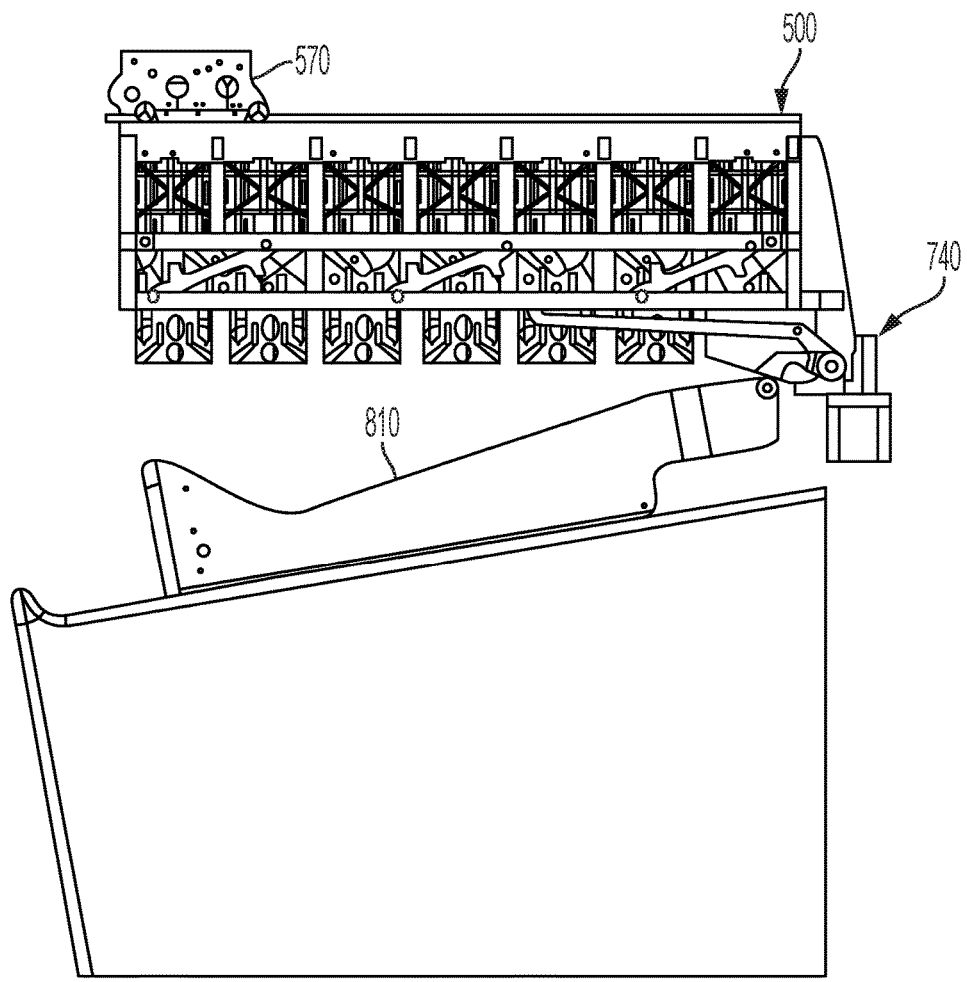
FIG. 9 is a side plan view of a multi-chute product dispensing mechanism of the merchandiser of FIG. 3 in use.

The merchandiser 170 also may include a dispense activation mechanism 740. As is shown in FIG. 8, the dispense activation system 740 may include a number of chute drive rails 750. An upper chute drive rail 760 may maneuver up and down via a number of drive levers 770. The upper chute drive rails 20 760 and the drive levers 770 may be maneuvered by a push rod 780. In turn, the push rod 780 may be maneuver by a drive gear 790 and a drive rod 800. The drive rod 800 may be motor driven. The rotation of the drive rod 800 may create linear motion for the push rod 780 via the drive gear 790 such that the upper chute drive rails 760 may interact with the product dispensing chutes 505. Other components and other configurations may be used herein.

The dispense activation mechanism 740 also may raise and lower a dispensing shutter 810. The dispensing shutter 810 may open and close the temperature controlled dispensing port 200. A shutter lever 820 may pivot the dispensing shutter 810 about a shutter pivot 830. The shutter lever 820 may be driven by the drive rod 800 for open and shut motion. Other components and other configurations may be used herein.

Figure 10:
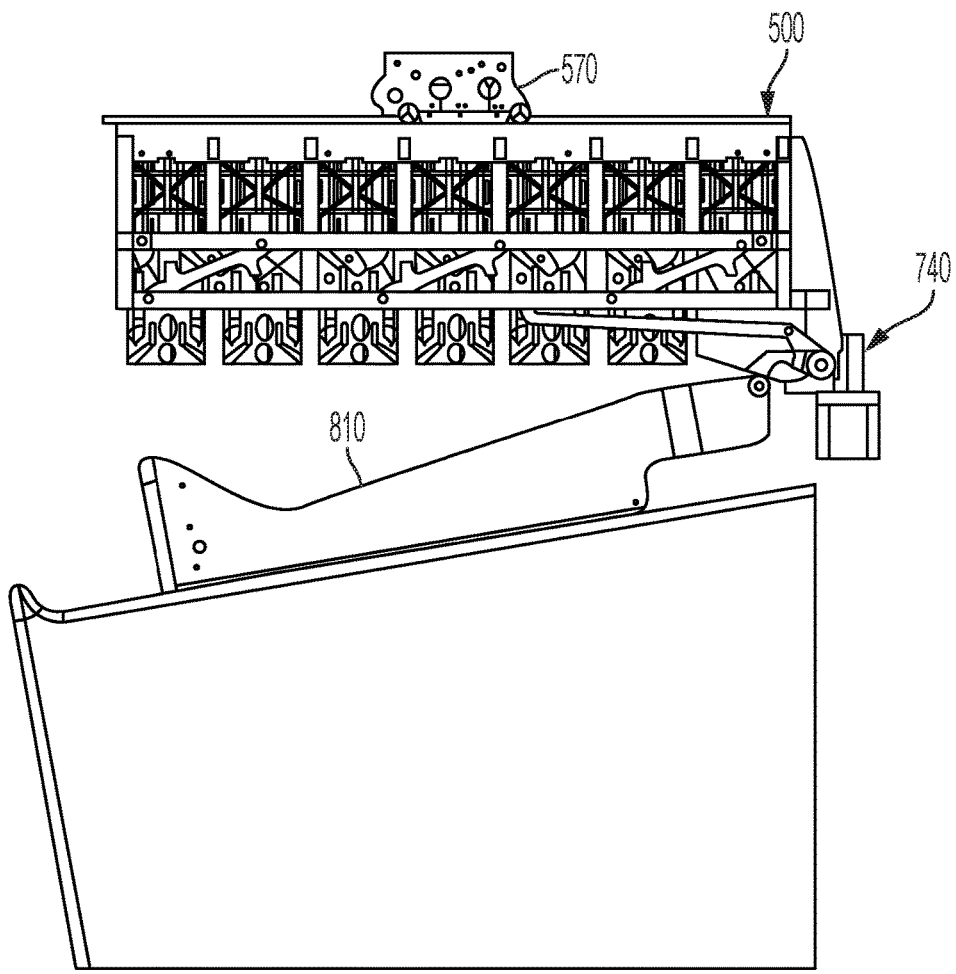
FIG. 10 is a side plan view of the multi-chute product dispensing mechanism of the merchandiser of FIG. 3 in use.

FIGS. 9-12 show the operation of the merchandiser 170. A temperature controlled product 30 may be selected to be vended from the merchandiser 170. Upon receiving payment, the X-Y drive device 560 may be positioned under an ambient product column 210 corresponding to the selected temperature controlled product 30. An ambient product 20 from the corresponding ambient product column 210 may be positioned within the product carriage of the X-Y drive device 560 via the dispensing flap 260. The X-Y drive device 560 may maneuver the product carriage 570 to the appropriate product chute 505. For example, if product A is selected to be vended, then ambient product A will be provided from the corresponding ambient product column 210 to the X-Y drive device 560, the X-Y drive device 560 will deliver the product carriage 570 to the product chute 505 with a number of temperature controlled brand A products 30 therein. As described above, the corresponding product chute 505 may be positioned at a different X-Y location as the corresponding ambient product column 210. The product carriage 570 thus may be maneuvered over the appropriate product chute 505 as is shown in FIG. 10. Positioning the product carriage 570 over the product chute 505 also causes the product carriage 570 to engage the activation lever 700 of the given product chute 505.

Figure 11:
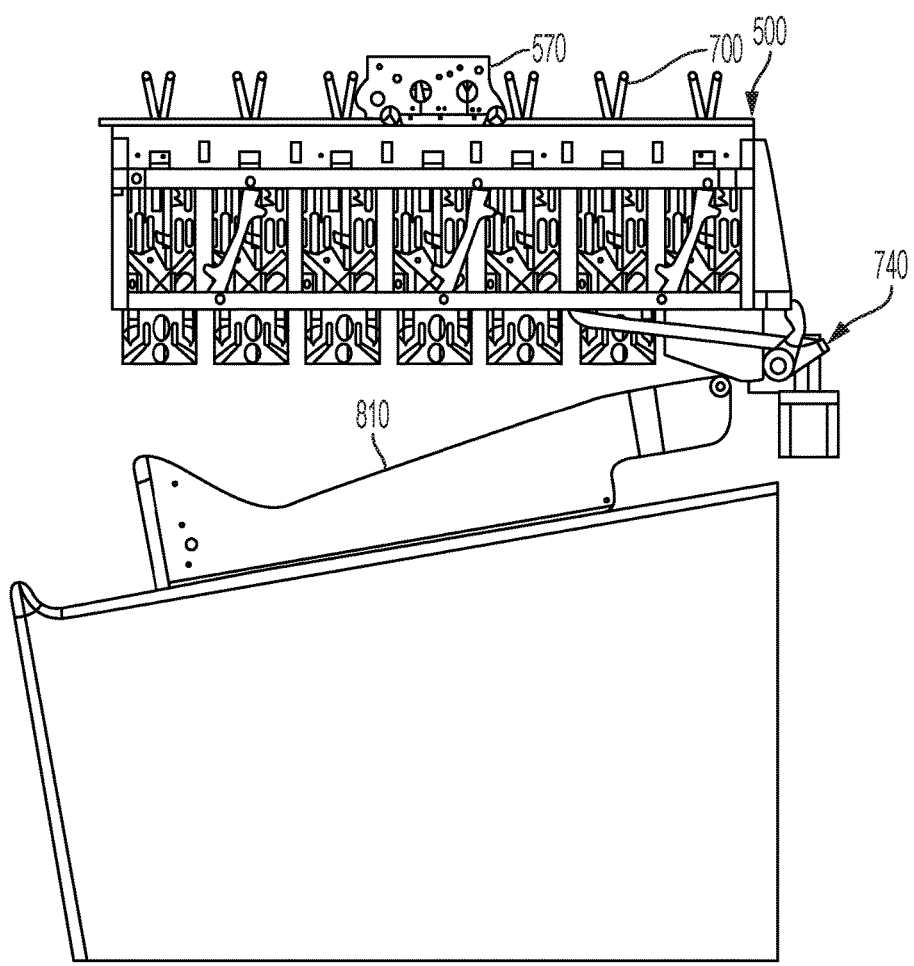
FIG. 11 is a side plan view of the multi-chute product dispensing mechanism of the merchandiser of FIG. 3 in use.
Figure 12:
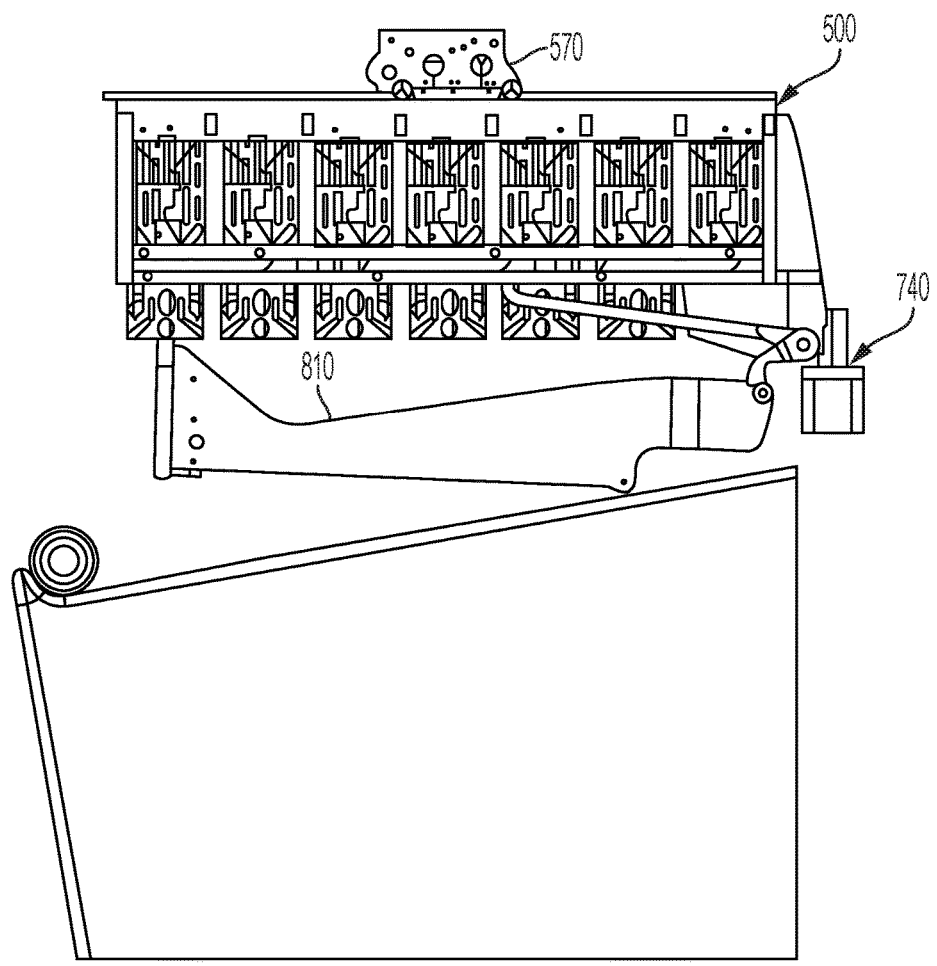
FIG. 12 is a side plan view of the multi-chute product dispensing mechanism of the merchandiser of FIG. 3 in use.

As is shown in FIG. 11, the dispense activation mechanism 740 maneuvers the upper chute drive rail 760 so as to push upward the activation lever 700 of the product chute 505. Raising the activation lever 700 also raises the upper guide plate 680. The lower stopper plates 720 begin in an engaged position to support a product therein while the upper stopper plates 710 are open. As the upper guide plate 680 rises, the plate 680 engages the locking plate 610 and the product support bars 580 of the product carriage 570 and pushes them outwardly so as to permit the product therein to drop into the product chute 505. Further motion of the upper chute drive rail 760 begins to pull the lower guide plate 690 such that upper stopper plates 710 close and then the lower stopper plates 720 open such that a temperature controlled product 30 falls out of the product chute 505. Further rotation of the drive rod 800 also rotates the shutter lever 820 such that the dispensing shutter 810 opens and the product 30 rolls into the temperature controlled dispensing port 200. Other components and other configurations may be used herein.

Although the merchandiser 170 may be used within the context of a chilled beverage, warm or hot beverages and other products also may be used herein. Moreover, an ambient-for-hot merchandiser also comes with product quality and extended shelf life benefits. Many hot equipment solutions with a large stock of hot products generally require dispensing before a given best-consumed-before-date.

Inside an oven, product quality may deteriorate quickly such that consumption of the hot beverage would need to take place within just a couple of days of loading or restocking. With the merchandiser herein, only a limited number of products may be kept hot for a shorter period of time. This offers both energy saving benefits and product quality benefits. Similarly, the merchandiser 170 also may have both a cold compartment and a hot compartment. The size, shape, configuration, and temperature of these compartments may vary. Alternative compartments also include a super-chill compartment for maintaining super-chilled fluids.

Figure 13:
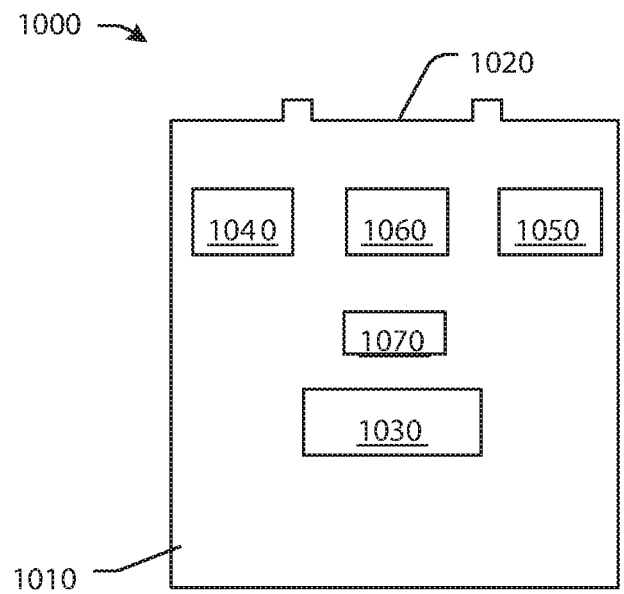
FIG. 13 is a schematic view of a further embodiment of a merchandiser as may be described herein.

FIG. 13 shows a further embodiment of a merchandiser 1000 as may be described herein. The merchandiser 1000 may include an outer shell 1010. The outer shell 1010 may be made out of any type of substantially rigid material and may have any suitable size, shape, or configuration. The outer shell 1010 may be insulated in whole or in part. The outer shell 1010 may include an input port 1020 and a dispensing port 1030. An identification module 160 and other components and other configurations may be used herein.

The merchandiser 1000 may include a controller 1040. The controller 1040 may be any type of programmable logic device with appropriate data storage mediums. More than one controller 1040 may be used herein. The controller 1040 may be positioned with in the merchandiser 1000 or remote therefrom. The overall operation of the merchandiser 1000 may be controlled by the controller 1040. The merchandiser 1000 also may include an input/output device 1050 in communication with the controller 1040. The input/output device 1050 may be a conventional video screen, touch screen, keypad, and the like. The input/output device 1050 may provide any type of messaging to the consumer as well as provide operational parameters for the merchandiser 1000 as a whole. The merchandiser 1000 may include a communications device 1060. The communications device 1060 may be of conventional design and may allow the merchandiser 1000 to communicate wirelessly or otherwise with consumers as well as transmit and receive operational data and other types of communications to and from the merchandiser operator or elsewhere.

Figure 14:
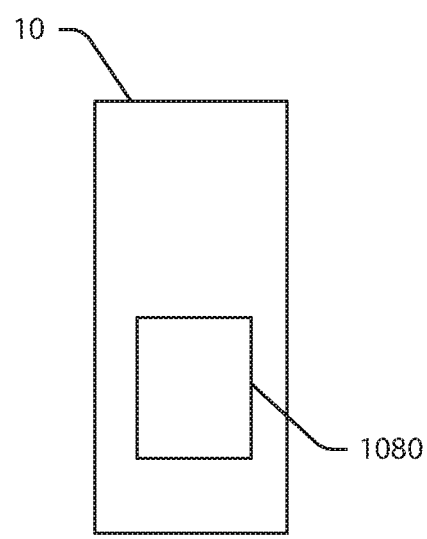
FIG. 14 is a schematic view of a product that may be used with the merchandiser of FIG. 13.

The merchandiser 100 also may include a printer 1070. The printer 1070 may be of conventional design. The printer 1070 may be positioned about the dispensing port 1030 or elsewhere. The printer 1070 may print directly onto the products 10 themselves or onto labels 1080 or other surfaces as desired. As is shown in FIG. 14, the printer 1070 may print a label 1080 for application to the product 10. Other components and other configurations may be used herein.

The communications device 1060 of the merchandiser 1010 may wirelessly receive data from, for example, a biosensor of a consumer. The controller 1040 then may suggest one type of product I O to accommodate the received bio-data via the input/output device 1050. Other types of consumer input may be used herein. Specifically, non-physiological data also may be considered. For example, exertion data may be used so as to determine the appropriate product for the consumer. Moreover, the merchandiser 1000 may dispense other types of additives or ingredients intended for use with the product 10 depending upon the input. The merchandiser 1000 also may communicate with the consumer by, for example, sending a targeted text messages to the consumer's phone. Such messages may include coupons, sales offers, or other types of information. Similarly, the printer 1070 may print the label 1080 so as to personalize the product I O with, for example, the consumer's name or other indicia. Other types of product personalization may be used herein. The merchandiser 1000 described herein thus may deliver a personalized experience to the consumer.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A merchandiser for dispensing a number of products, comprising:
    an ambient compartment, the ambient compartment comprising a plurality of ambient product columns configured to hold a plurality of ambient products therein;
    an X-Y drive device positioned beneath the ambient compartment; and
    a temperature controlled compartment positioned beneath the X-Y drive device, the temperature controlled compartment comprising a plurality of temperature controlled product columns configured to hold a plurality of temperature controlled products therein;
    wherein the X-Y drive device includes a product carriage and a number of X drive rods and Y drive rods enabling the product carriage to move in an X-Y plane perpendicular to the temperature controlled product columns to receive an ambient product of a first type from one of the plurality of ambient product columns of the ambient compartment at a first position in the X-Y plane, and carry the ambient product of the first type to a second position in the X-Y plane; and further wherein the product carriage is configured to allow the ambient product of the first type to fall out of the product carriage into a temperature controlled product column of the temperature controlled compartment associated with temperature controlled products of the first type.

2. The merchandiser of claim 1, wherein the plurality of ambient product columns comprises a plurality of serpentine product columns.

3. The merchandiser of claim 1, wherein the plurality of ambient product columns comprises a dedicated ambient product column.

4. The merchandiser of claim 3, wherein the ambient compartment comprises an ambient dispensing port in communication with the dedicated ambient product column.

5. The merchandiser of claim 1, wherein the plurality of ambient product columns comprises a dispensing flap.

6. The merchandiser of claim 1, wherein the plurality of temperature controlled product columns comprises a loading flap.

7. The merchandiser of claim 1, wherein the temperature controlled compartment comprises a temperature controlled dispensing port.

8. The merchandiser of claim 7, wherein the temperature controlled compartment comprises an angled floor positioned under the plurality of temperature controlled product columns and in communication with the temperature controlled dispensing port.

9. The merchandiser of claim 1, wherein the temperature controlled compartment comprises a plurality of temperature sections.

10. The merchandiser of claim 9, wherein the plurality of temperature sections comprises a heated temperature section and a refrigerated temperature section.

11. The merchandiser of claim 9, wherein the temperature controlled section comprises an insulated wall positioned between a pair of temperature sections.

12. The merchandiser of claim 1, wherein the product carriage includes a number of product support bars extending along a length of the product carriage, the product support bars being moveable within J shaped support bar slots to allow the ambient product of the first type to fall through the product carriage.

13. The merchandiser of claim 12, wherein the plurality of temperature controlled product columns comprises an activation lever that cooperates with the product carriage.

14. The merchandiser of claim 1, wherein the plurality of temperature controlled product columns comprises a plurality of guide plates and a plurality of stopper plates.

* * * * *